July 26, 1966     G. HEYEK     3,263,105

VIBRATORY MOTORS

Filed May 21, 1962     2 Sheets-Sheet 1

INVENTOR
Gerhard Heyek

BY Watson, Cole, Grindle & Watson
ATTORNEYS

July 26, 1966  G. HEYEK  3,263,105
VIBRATORY MOTORS

Filed May 21, 1962  2 Sheets-Sheet 2

INVENTOR
Gerhard Heyek

BY Watson, Cole, Grindle & Watson
ATTORNEYS

United States Patent Office 3,263,105
Patented July 26, 1966

3,263,105
VIBRATORY MOTORS
Gerhard Heyek, Graz, Styria, Austria, assignor to Carinthia-Elektrogeräte Gesellschaft m.b.H., Klagenfurt, Carinthia, Austria
Filed May 21, 1962, Ser. No. 196,107
Claims priority, application Austria, May 31, 1961, A 4,270/61
10 Claims. (Cl. 310—25)

In dry shaving appliances and other apparatus having vibratory motors, the problem arises of keeping the casing or frame of the apparatus as free as possible from the mechanical vibrations produced by the motor.

The invention relates especially to motors including two members including magnetic parts and oscillating in opposite directions under the influence of a solenoid energised with an alternating current, and under the influence of a return spring. The magnetic circuit may also include stationary magnetic core parts if necessary. The oscillating movement of the two members is rendered possible by means of a pivoted mounting or rolling mounting for these members or by resiliently clamping the members together.

In general there is no great difficulty in balancing those components of the inertia forces of the two oscillating members which extend in opposite directions. However, as the centres of gravity of the two members oscillate along an arc, there are in addition superimposed components, at right angles to the first-mentioned components, which are in the same direction for both members. The balancing of these last components of the inertia forces has not been achieved hitherto, and this therefore gives rise to disturbing vibrations of the casing, the frame or other holding means of the vibratory motor and of the entire apparatus driven by it.

Referring now to the drawings.

Figure 1:
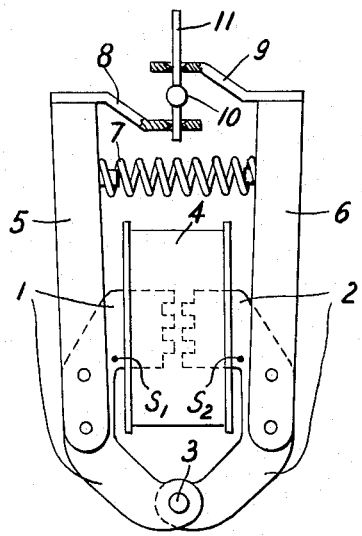
FIG. 1 is a side elevation of one form of the motor with certain parts in section.

In order to explain these conditions, FIGURE 1 shows in elevation a known motor having two magnetic limbs 1 and 2 oscillating in opposite directions. These two magnetic limbs 1 and 2, are substantially C-shaped and are toothed in a known manner at their upper ends so that they engage one within the other. They are pivoted on a common spindle 3 and have their toothed ends lying in a solenoid 4. An arm 5 is mounted on the limb 1 by means of rivets or the like and an arm 6 is mounted similarly on the limb 2. Between these two arms 5 and 6 there is arranged a return spring 7, the force of which (or, more strictly, the rate of which) determines the natural frequency of the entire oscillating system. The arms 5 and 6 carry at their free ends inwardly directed control lugs 8 and 9 respectively, angled in opposite directions, in which there are, for example, knife-edge bearings in which there engages a driving pin 11 pivoted at 10. On energisation of the solenoid 4 with alternating current, the pin 11 is set into oscillation about its bearing 10 by way of the magnetic limbs 1, 2, the arms 5, 6 and the control lugs 8, 9. The amplitude of the oscillations can be as large as may be desired, by suitable choice of the force of the spring 7 and by utilising the resonance characteristics of the system. The spring 7 is so dimensioned that it is relieved of compression just as the limbs 1 to 2, while moving apart, reach their mean positions; that is to say, when the moving members are stationary then they lie in their means positions.

Figure 2:
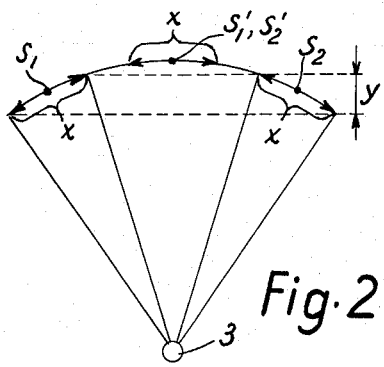
FIG. 2 is a diagram illustrating centers of gravity.

The inertia forces resulting from this arrangement can be seen from the diagram drawn to a larger scale in FIGURE 2. The centres of gravity of the oscillating members 1, 5, 8 and 2, 6, 9 (taking into consideration also the effect of the oscillation of the ends of the spring), are designated in FIGURES 1 and 2 by the references $S_1$ and $S_2$, respectively. The illustrated positions of the centres of gravity apply to the mean positions of the oscillating members. The centres of gravity oscillate in opposite directions within the range of the arcs $x$ shown in FIGURE 2 about mean positions $S_1$ and $S_2$, respectively. Those components of the inertia forces which extend horizontally in FIGURE 2 cancel out one another, as will readily be seen, whereas those components which are oriented vertically in FIGURE 2 and which correspond to travel component $y$ of the centres of gravity extend in the same direction and are therefore added to one another and thus give rise to a considerable vibration of the holding means or mounting of the motor.

According to the present invention a vibratory motor comprises two members mounted so as to oscillate under the influence of a solenoid and at least one return spring, when the solenoid is energised with the appropriate alternating current, the centres of gravity of the two oscillating members when the two members are in their mean positions being at least approximately coincidental.

The result of making the centres of gravity coincide can readily be seen from FIGURE 2. The means positions of the centres of gravity of the two oscillating members are designated in FIGURE 2 by the references $S_1'$ and $S_2'$, which coincide exactly. The two centres of gravity again move in opposite directions in the range of the arc $x$, which in this case lies close to a horizontal tangent passing through the point $S_1'$, $S_2'$. Consequently the inertia forces extending in the horizontal direction in FIGURE 2 still neutralise one another owing to their opposite directions, and forces of like direction extending vertically are small to the extent of being negligible, so that disturbing vibrations are avoided.

For carrying out the invention there are numerous possibilities as regards the shaping and dimensioning of the moving members. Preferably, each magnetic limb is connected to a counterweight part which displaces the resultant centre of gravity of the corresponding moving system, that is of the associated magnetic limb and the masses moved simultaneously by the latter, to such an extent in the direction of the resultant centre of gravity of the other moving system that the mean positions of the two centres of gravity are not at a considerable distance from one another, as in FIGURE 1, but coincide as shown in FIGURE 2.

For economic mass production of motors according to this invention it is desirable to make the motors so that they can be adapted readily to the mains frequencies customarily employed in various countries, i.e. the resonance frequency of the entire moving system should be variable practically speaking approximately within the range of 42 to 60 c.p.s. To alter the resonance frequency, it is advantageous to make the force of the return spring (spring 7 in FIGURE 1) variable. Since, however, it is desirable for the centres of gravity of the moving members to coincide when in their mean positions, the variation in the force of the return spring should preferably take place without any change in the relative positions of the two members when stationary. This ensures also that the air gap between the magnetic limbs (or between them and stationary magnetic core parts) are not changed.

Figure 4:
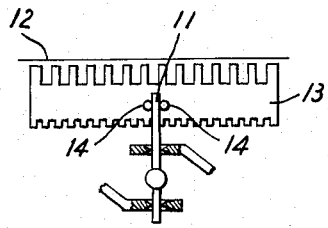
FIG. 4 is a plan view of a detail showing the connection between a part of the motor and one of the reciprocating cutters.
Figure 5:
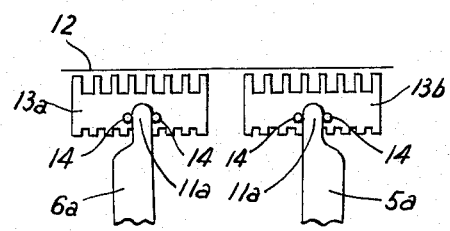
FIG. 5 is a plan view showing two reciprocating cutters connected to the respective limbs.
Figure 6:
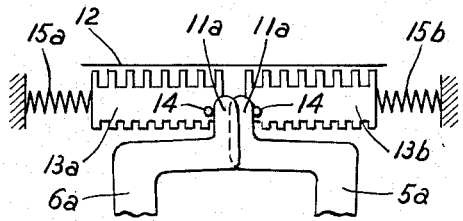
FIG. 6 is a view similar to FIG. 5, showing a modified connection for the limbs to the cutters.
Figure 3:
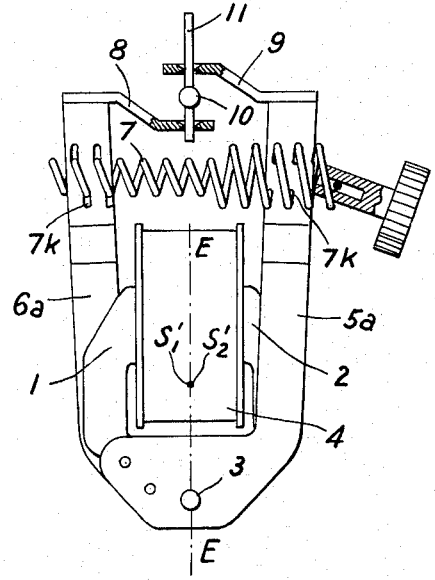
FIG. 3 is a side view of a modified vibratory motor with certain parts in section.
Figure 7:
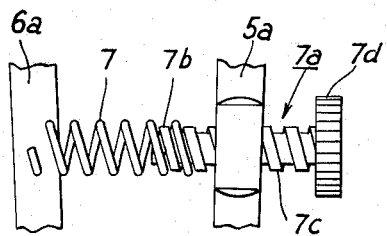
FIG. 7 is a side view illustrating the adjustment for the spring.
Figure 10:
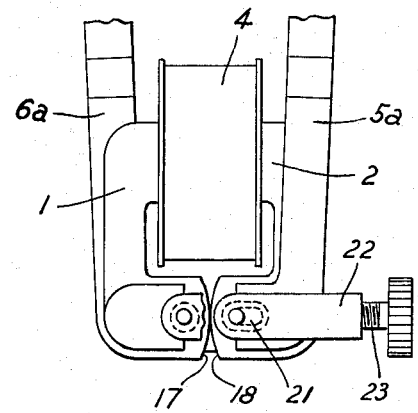
FIG. 10 is a side view showing a modified mounting for the limbs of the motor.
Figure 8:
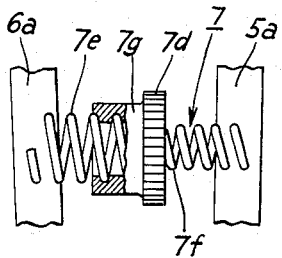
FIG. 8 is a side view showing a modified adjusting means for the spring.
Figure 11:
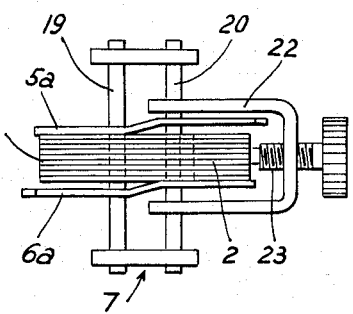
FIG. 11 is a plan view showing the adjusting means of the mounting of the limbs of FIG. 10.
Figure 9:
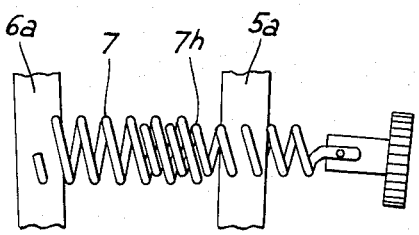
FIG. 9 is a side view showing a further modified adjustment for the spring.

Examples of motors according to the invention will now be described more fully with further reference to the drawings. FIGURE 3 shows a motor according to this invention in a similar view to FIGURE 1 (without the casing). FIGURES 4 to 6 illustrate various possibilities for driving one or more reciprocating cutters of a dry shaver, employing a motor according to FIGURE 3. FIGURES 7 to 9 illustrate various spring arrangements which permit a variation in the force of the return spring without otherwise affecting the motor. Finally, FIGURES 10 and 11 show in front elevation and from below, respectively, a motor which includes a rolling mounting and a device for varying the force of a return spring clamping the rolling surfaces one against the other.

In FIGURE 3, parts corresponding to one another are designated in the same way as in FIGURE 1, but in the apparatus according to FIGURE 3 the substantially C-shaped magnetic limb 2 is connected by means of rivets or the like to an arm 5a which is located opposite the magnetic limb 1 with respect to a central plane E—E extending between the two magnetic limbs 1, 2 through the bearing 3. The arm 5a serves as a counterweight thereby displacing the centre of gravity $S_1'$ of the moving member formed by the magnetic limb 2, the arm 5a and the control lug 9 (and taking into consideration also the simultaneously moved masses, i.e., the driving pin 11, the return spring 7 and the part of the apparatus moved by the driving pin 11) into the plane E—E. The C-shaped magnetic limb 1 is similarly connected to an arm 6a serving as a counterweight, whereby the centre of gravity $S_2'$ of the second moving member (and the simultaneously moved masses) is also shifted into the plane E—E, so that the two centres of gravity $S_1'$ and $S_2'$ coincide when the two moving systems are located in their positions of rest corresponding to their mean positions during oscillation.

In the arrangement shown in FIGURE 3 the return spring 7 is arranged between the arms 5a and 6a. The spring is relieved of stress precisely in the rest position of the two moving systems and is subjected alternately to compression and tension in the two half cycles during oscillation.

The driving force of the motor can be transmitted in various ways to the part to be driven. For the special case of a dry shaver, FIGURE 4 shows diagrammatically how the driving pin set in oscillation about its bearing 10 by the motor can be used for driving a reciprocating cutter 13 arranged below an arched perforated shearing blade 12, the cutter being arched and slotted similarly to the blade. (The blade and cutter are shown only in a diagrammatic longitudinal section.) The free end of the driving pin 11 engages between two abutment pins 14 extending across the arch of the cutter 13.

As an alternative the two arms 5a, 6a may control two separate cutters 13a, 13b which are independent of one another, as illustrated in FIGURES 5 and 6. In this case, the upper parts of the arms 5a, 6a are narrowed to form driving fingers 11a which as shown in FIGURE 5, each engage between two abutment pins 14 on cutters 13a, 13b reciprocated in opposite directions or, as shown in FIGURE 6, act behind an abutment pin 14 on each cutter 13a, 13b and in this way push the associated cutter only outwards, while the return movement of the cutter is effected by a spring 15a, 15b supported at one end against the head or top of the shaver and at the other end against the respective cutter.

As already mentioned, the entire oscillating system has a mechanical resonance frequency (i.e. an optimum operating frequency) which is substantially dependent on the moving masses and the force of the return spring 7. In order to render possible the matching of this mechanical resonance frequency to the various conventional mains frequencies, the return spring 7 is so designed that its force or, more strictly, its rate can be varied without the relative position of the two moving systems being altered in the process, so that on a change in the spring force the coincidence of the centres of gravity of these moving systems which is required in their mean positions of oscillation for the avoidance of disturbing vibrations is not lost.

Various constructional forms of such a spring arrangement are illustrated in FIGURES 7 to 9 and a further constructional form is shown in FIGURE 3. According to FIGURE 7, the return spring 7 is formed as a coil spring of which, by screwing in a threaded pin 7a engaging the turns of the spring, the thread 7b of which has the same pitch as the coil spring 7, parts of the turns can be rendered ineffective. The threaded pin 7a is provided, for example, with a milled knob 7d provided in turn with a threaded part 7c which can be screwed into a threaded hole in the arm 5a, the thread in the hole having the same pitch as the coil spring 7 and the part 7b of the pin. When the part 7b of the pin is screwed into the coil spring 7, the thread 7c is screwed at the same time into the arm 5a, so that in the unstressed state of the spring 7, the distance between the arms 5a, 6a is maintained and only a part of variable length of the spring 7 is rendered ineffective for the purpose of altering the spring force. Similarly, instead of a pin which can be screwed into the spring as shown in FIGURE 7, it is possible to employ a nut which can be screwed onto the spring and which is likewise guided so that it can be displaced axially at one point of action of the spring, that is, for example, at the arm 5a.

In the example shown in FIGURE 8 the coil spring 7 consists of two parts 7e, 7f of different diameters and at the junction point of the two parts of the spring a nut 7g engaging the turns of the part of the spring of larger diameter can be screwed over that part of the spring. The nut 7g is again provided with a milled surface 7d. Similarly, it is also possible to employ here as an alternative a pin adapted to be screwed into the spring of smaller diameter.

FIGURE 9 shows that the pin according to FIGURE 7 which can be screwed into the spring may also be formed by a helically wound piece of wire 7h which may in turn exhibit spring properties, but may alternatively be relatively rigid. The nut employed in FIGURE 8 may also be replaced in similar manner by a helically wound piece of wire.

In the preferred spring arrangement illustrated in FIGURE 3, the return spring 7 is a coil spring with an abruptly varying turn diameter but of the same pitch throughout. While retaining the same pitch throughout, the turn diameter of the coil spring may alternatively vary gradually, so that the spring has a frusto-conical shape. The ends of the spring are so guided at their points of engagement in the arms 5a and 6a that the spring can be shifted in the axial direction with a screwing action, the distance between the arms 5a, 6a remaining constant owing to the constant pitch of the spring. According to the ratio of the lengths of the large diameter and small diameter parts of the spring located between the two arms, the effective spring becomes softer or harder, that is to say its rate its variable. The guiding of the spring in the arms 5a, 6a in such manner that a screwing action may be used to displace the spring can be obtained in various ways, for example by means of matching screw threads on nuts or pins, but it is simplest to provide slots 7k in the arms 5a, 6a through which the spring wire passes, the length of each slot corresponding to the difference between the maximum and minimum radii of the turns of the spring, so that the spring can be screwed in and out in both directions as far as desired.

FIGURES 10 and 11 show a motor in which a rolling mounting is provided for the two moving systems instead of a pivot bearing. To this end, the lower ends of the magnetic limbs 1, 2 as seen in FIGURE 10 engage one another at rolling surfaces 17, 18; these surfaces may have co-operating teeth. As will be seen from the bottom view according to FIGURE 11, the two rolling surfaces are clamped against one another by means of a bending spring 19, 20 acting as a return spring, one bending rod 19 extending with little play through the moving member formed by the magnetic limb 1 and its arm 5a, while the second bending rod 20 passes through a slot 21 provided close to the rolling surface 18 in the other moving member. On this second bending rod 20 there acts a tensioning shackle 22 which is supported by means of a screw 23 against the second member (2, 6a). In this arrangement the bending rods 19, 20 are initially stressed to the minimum extent in the rest position of the two moving systems (for any given setting of the screw), which corresponds to the position according to FIGURE 10, whereas when the members are swung out of this position in one direction or the other the rods are flexed apart. The force which is required to flex the rods apart can be adjusted by means of the screw 23 without this adjustment affecting the rest position of the two moving systems.

The examples illustrated may be modified in various ways within the scope of the invention. In particular, the two moving systems need not be of symmetrical construction.

I claim:

1. A vibratory motor comprising two opposingly oscillating magnetic limbs, an operating winding to which alternating current is supplied, a return spring mounted between the limbs, said magnetic limbs being mounted to vibrate coaxially, a control lug for each magnetic limb so that the limbs and their lugs have centers of gravity as to the two movable limbs whereby the said centers of gravity at least approximately coincide in the mean position of the oscillation of the limbs and lugs, each oscillating member consisting of a limb of magnetic material which lies on one side of a central plane lying between the magnetic limbs and which is acted upon by a solenoid during use, and an arm on the other side of the central plane from which the vibratory output of the motor is derived.

2. A vibratory motor according to claim 1 in which the return spring is formed as a coil spring on a threaded pin engaging the turns of the spring, so that selectable parts of the turns can become ineffective, the pin being guided at one point of the action of the spring so that it can be displaced axially by means of a thread of the same pitch as the spring.

3. A vibratory motor according to claim 1 in which the coil spring consists of two parts of different diameters, and at the junction of the two parts of the spring a nut is screwed over that part of the spring which is of larger diameter.

4. A vibratory motor according to claim 1 in which, the return spring is a coil spring having a steadily varying turn diameter but of the same pitch throughout, the ends of the coil spring being so guided in the limbs that the spring can be shifted in the axial direction by a screwing action.

5. A vibratory motor according to claim 1 in which the spring wire extends at least in the case of one limb through slots in the limb, the length of the slots being equal to the difference between the maximum and minimum radii of the turns of the spring.

6. A vibratory motor according to claim 1 in which the two oscillating limbs have rolling surfaces which are clamped against one another by the return spring and which permit the two limbs to oscillate with a rolling action with respect to one another.

7. A vibratory motor according to claim 1 in which the return spring is formed by two flexible rods each of which passes through a hole in one of the two limbs close to the rolling surface, the rods being connected together at their ends and being flexed apart by the rolling action during oscillation of the members.

8. A vibratory motor according to claim 1, in which the coil spring consists of two parts of different diameters and at the junction of the two parts of the spring a pin is screwed over that part of the spring which is of smaller diameter.

9. A vibratory motor according to claim 1, in which the coil spring consists of two parts of different diameters, and at the junction of the two parts of the spring a nut is screwed over that part of the spring which is of larger diameter, and in which the nut is formed by a helically wound piece of wire.

10. A vibratory motor according to claim 1, in which the coil spring consists of two parts of different diameters and at the junction of the two parts of the spring a pin is screwed over that part of the spring which is of smaller diameter and in which the pin is formed by a helically wound piece of wire.

References Cited by the Examiner

UNITED STATES PATENTS

| | | | |
|---|---|---|---|
| 2,239,931 | 4/1941 | Prescott | 310—29 |
| 2,259,131 | 10/1941 | Fleischer et al. | 310—29 |
| 3,076,108 | 1/1963 | Oliver et al. | 310—29 |
| 3,085,168 | 4/1963 | Jones et al. | 310—25 |

FOREIGN PATENTS

| | | |
|---|---|---|
| 112,717 | 3/1941 | Australia. |
| 1,080,375 | 5/1954 | France. |

MILTON O. HIRSHFIELD, *Primary Examiner.*

O. L. RADER, *Examiner.*

C. W. DAWSON, D. F. DUGGAN,
*Assistant Examiners.*